United States Patent
Delfino et al.

(10) Patent No.: US 11,803,287 B2
(45) Date of Patent: Oct. 31, 2023

(54) UNLOCK OF A 3D VIEW

(71) Applicant: DASSAULT SYSTEMES, Velizy-Villacoublay (FR)

(72) Inventors: Christophe Delfino, Sophia Antipolis Biot (FR); Jeremy Lamboley, Velizy-Villacoublay (FR); Adrien Rougier, Velizy-Villacoublay (FR)

(73) Assignee: DASSAULT SYSTEMES, Velizy-Villacoublay (FR)

( * ) Notice: Subject to any disclaimer, the term of this patent is extended or adjusted under 35 U.S.C. 154(b) by 57 days.

(21) Appl. No.: 17/135,239

(22) Filed: Dec. 28, 2020

(65) Prior Publication Data
US 2021/0200421 A1  Jul. 1, 2021

(30) Foreign Application Priority Data
Dec. 30, 2019 (EP) ..................................... 19306789

(51) Int. Cl.
G06F 3/04815 (2022.01)
G06T 7/73 (2017.01)
G06F 3/04845 (2022.01)
G06T 19/20 (2011.01)

(52) U.S. Cl.
CPC ...... *G06F 3/04815* (2013.01); *G06F 3/04845* (2013.01); *G06T 7/74* (2017.01); *G06T 19/20* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 6,426,745 B1* | 7/2002 | Isaacs | ................. | G06F 3/04845 345/619 |
| 6,867,787 B1* | 3/2005 | Shimizu | ................. | G06T 11/203 345/441 |
| 8,368,723 B1* | 2/2013 | Gossweiler, III | ... | G06F 3/04883 345/670 |
| 8,732,624 B2* | 5/2014 | Cleron | ................. | G06F 3/04883 715/863 |
| 9,324,188 B1 | 4/2016 | Fram et al. | | |

(Continued)

OTHER PUBLICATIONS

Lee, Jae Yeol, Dong Woo Seo, and Gue Won Rhee. "Tangible authoring of 3D virtual scenes in dynamic augmented reality environment." Computers in Industry 62.1 (2011): 107-119. (Year: 2011).*

(Continued)

*Primary Examiner* — Michael Roswell
*Assistant Examiner* — Maria S Ayad
(74) *Attorney, Agent, or Firm* — Oblon, McClelland, Maier & Neustadt, L.L.P.

(57) ABSTRACT

A computer-implemented method for switching from a first 3D view of a 3D scene to a second 3D view of the 3D scene including obtaining the first 3D view displayed from a plane of a locked viewpoint of the 3D scene, detecting a continuous user interaction including a slide a first and second location on the plane. The method further comprises computing a distance traveled by the slide, comparing the computed distance with a predetermined distance, and if the computed distance is greater than the predetermined distance, a switch from the first 3D view to the second 3D view is performed.

15 Claims, 5 Drawing Sheets

(56) References Cited

U.S. PATENT DOCUMENTS

| | | | | |
|---|---|---|---|---|
| 9,829,996 B2* | 11/2017 | Hosenpud | | G06F 3/0488 |
| 10,042,549 B2* | 8/2018 | Migos | | G06F 3/0485 |
| 10,127,722 B2* | 11/2018 | Shakib | | G06T 15/205 |
| 10,417,833 B2* | 9/2019 | Eisenmann | | G06T 15/20 |
| 10,949,978 B2* | 3/2021 | Holzer | | G06T 7/194 |
| 11,113,885 B1* | 9/2021 | Cordes | | A63F 13/35 |
| 2008/0294401 A1* | 11/2008 | Tsin | | G06T 17/00 |
| | | | | 345/589 |
| 2014/0002502 A1* | 1/2014 | Han | | G06T 3/40 |
| | | | | 345/646 |
| 2014/0278283 A1* | 9/2014 | Reghetti | | G06T 19/20 |
| | | | | 703/1 |
| 2014/0282161 A1 | 9/2014 | Cash | | |
| 2014/0313203 A1* | 10/2014 | Shugart | | G06T 19/003 |
| | | | | 345/427 |
| 2015/0029093 A1* | 1/2015 | Feinstein | | E21B 47/13 |
| | | | | 345/156 |
| 2016/0188159 A1* | 6/2016 | Dayde | | G06F 3/04815 |
| | | | | 715/782 |
| 2017/0032570 A1* | 2/2017 | Bear | | G05D 1/0016 |
| 2019/0340832 A1* | 11/2019 | Srinivasan | | G06T 19/20 |
| 2020/0234451 A1* | 7/2020 | Holzer | | G06T 7/73 |

OTHER PUBLICATIONS

European Search Report dated Jun. 25, 2020, corresponding to European application No. 19306789.9. field on Dec. 30, 2019, Cited Refs therein AA and AB.

* cited by examiner

UNLOCK OF A 3D VIEW

CROSS-REFERENCE TO RELATED APPLICATIONS

This application claims priority under 35 U.S.C. § 119 or 365 to European Application No. 19306789.9, filed Dec. 30, 2019. The entire contents of the above application(s) are incorporated herein by reference.

FIELD

The disclosure relates to the field of computer programs and systems, and more specifically to a method, system and program for switching from a first 3D view to a second 3D view of a 3D scene.

BACKGROUND

Applications that provide three-dimensional (3D) representations of objects are more and more common. A 3D representation comprises one or more 3D objects. The 3D representation is also referred to as 3D scene. The 3D objects and the background form the graphic elements of the 3D scene.

The 3D scene can comprise a background image that serves to create an impression of depth of the 3D scene. The background can be a 2D image, and the scene is called 2,5D scene or pseudo-3D scene. A pseudo-3D scene can be correctly seen according to only one viewpoint. For that reason, the view on a pseudo-3D scene is locked, that is, it is not possible to change the viewpoint on the pseudo-3D scene.

Some applications allow unlocking of the viewpoint on the pseudo-3D scene and provide the user with a true 3D scene. Inversely, applications allow locking of the viewpoint on the 3D scene and provide the user with 2,5D scene. Hence, the user can switch from the 2,5 world to the 3D world, and inversely.

Several approaches exist for switching form a pseudo-3D scene to a 3D scene. A first approach is to provide an icon that can be activated by the user in order to trigger the switch from 2,5D to 3D. The same icon or another one can be used to switch from 3D to 2,5D. However, this approach is not satisfactory for the user in term of ergonomics. Firstly, the user has to click on the icon often placed on the screen border, which may be cumbersome. Secondly, the display of an icon is not the best practice with mobile devices that generally have a small screen: the icon takes up too much space of the display. Thirdly, clicks on icons should be prevented when interacting with a mobile device with mobile devices as icons have a small size compared to finger size. Fourthly, the user cannot select a viewpoint of the 3D scene in the course of the switch from 2,5D to 3D. The user has to perform another gesture, which is cumbersome.

A second approach is to provide gestures for triggering the switch. Known gestures are performed by pressing keys of the keyboard and clicking on the mouse in the same time. These gestures cannot be used with a mobile device or on a touch-sensitive display. Furthermore, these gestures do not allow the user to select a viewpoint in the 3D before the switch has occurred.

Thus, according to the limitations of the existing solutions shortly discussed above, there is a need for an method for switching from a first 3D view to a second 3D view of a 3D scene that improves ergonomics and can be used on both mobile devices and touch-sensitive displays.

SUMMARY

It is therefore provided a computer-implemented method for switching from a first 3D view of a 3D scene to a second 3D view of the 3D scene. The method comprises:
providing the first 3D view displayed from a plane of a locked viewpoint of the 3D scene;
detecting a continuous user interaction comprising a displacement between a first location on the plane and a second location on the plane;
computing a distance between the first and second locations on the plane for each modification of the second location;
comparing the computed distance with a predetermined distance; and
if the computed distance is greater than the predetermined distance, switching from the first 3D view to the second 3D view.

The method may comprise one or more of the following:
after the comparing, computing a viewpoint of the second 3D view based on the first and second locations on the plane;
the computing (S42) a viewpoint on the second 3D view comprises computing a value of a ratio between the computed distance and the predetermined distance, unlocking the locked viewpoint, modifying the unlocked viewpoint to form the viewpoint of the second 3D view, the modification of the unlocked viewpoint being based on the computed value of the ratio;
if the computed value of the ratio is comprised between P and Q, with P and Q real numbers and P<Q, starting displaying a rotation of the unlocked viewpoint with a first rotation speed, if the computed value of the ratio is larger than Q, continuing displaying the rotation of the locked viewpoint with a second rotation speed;
the starting displaying a rotation of the unlocked viewpoint is performed on the first 3D view of the 3D scene and the continuing displaying the rotation of the viewpoint is performed on the second 3D view of the 3D scene;
P=1, Q=2, and the second rotation speed is 10 times larger than the first rotation speed;
if the continuous user interaction is released while the computed value of the ratio is comprised between P and Q: stopping the rotation of the locked viewpoint and returning to the unlocked viewpoint with the first rotation speed;
if the continuous user interaction is released for the value of the ration that is larger than Q: stopping the rotation of the current viewpoint and setting the rotated unlocked viewpoint as the viewpoint on the second 3D view;
the 3D scene comprises at least one 3D modeled object and wherein the rotation of the unlocked viewpoint is performed about an axis of rotation centered on the at least one target object;
the predetermined distance is comprised between 15 and 30% of the Euclidian distance of a width of a display displaying the providing.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

The system may comprise a touch sensitive display for receiving and detecting user interactions. The system may be a smartphone or a tablet.

BRIEF DESCRIPTION OF THE DRAWINGS

Embodiments will now be described, by way of non-limiting example, and in reference to the accompanying drawings, where.

DETAILED DESCRIPTION

Figure 1:
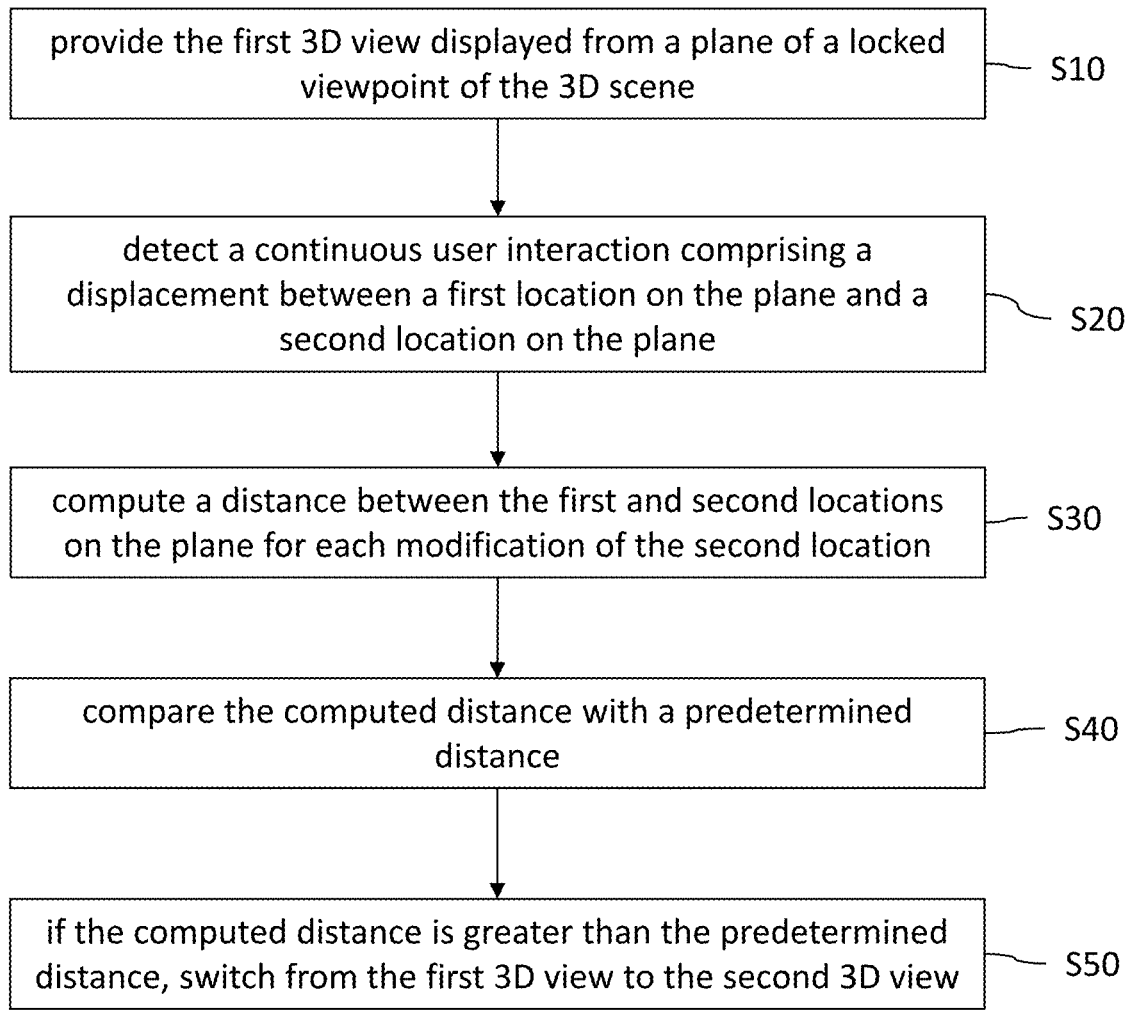
FIG. 1 shows a flowchart of an example of the method.

With reference to the flowchart of FIG. 1, it is described a computer-implemented method for switching from a first 3D view of a 3D scene to a second 3D view of the 3D scene. The method comprises providing the first 3D view. The first 3D view is displayed from a plane of a locked viewpoint of the 3D scene. The method also provides detecting a continuous user interaction comprising a displacement between a first location on the plane and a second location on the plane. For instance, the user interaction is a slide on a touch-sensitive display. The method further comprises computing a distance between the first and second locations on the plane for each modification of the second location. The distance is measured while the continuous user interaction is detected. The method also comprises a comparison between the computed distance with a predetermined distance, and if, as a result of the comparison it is determined that the computed distance is greater than the predetermined distance, a switch from the first 3D view to the second 3D view is performed.

Such a method improves the unlocking of a 3D scene. Notably, the method relies on a gesture that can be performed on a mobile device, a desktop and any device with touch-sensitive display to unlock a view and change the viewpoint position/orientation in a single movement. Further advantages will be discussed below.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

For instance, the step of detecting a continuous user interaction involves that the user performs an action on the system. For instance, the continuous user interaction may be a slide on a touch-sensitive display performed with an appendage such as a finger, a device such as a stylus.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates views on a 3D scene. A 3D scene comprises at least one modeled object. A modeled object is any object defined by data stored e.g. in the database. By extension, the expression "modeled object" designates the data itself. According to the type of the system, the modeled objects may be defined by different kinds of data. The system that performs the embodiments may be any computer able to render a 3D scene. In examples, the system may be any combination of a Computer-Aided Design (CAD) system, a Computer-Aided Engineering (CAE) system, a Computer-Aided Manufacturing (CAM) system, a PDM system and/or a Product Lifecycle Management (PLM) system. In those different systems, modeled objects are defined by corresponding data. One may accordingly speak of CAD object, PLM object, Product Data Management (PDM) object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

A modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). For instance, a peudo-3D scene comprises 3D objects (e.g. 3D modeled object) and 2D icons.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electromechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round) and/or standard surfacing features (e.g. sweep, blend, loft, fill, deform, and/or smoothing). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (e.g. a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

Figure 2:
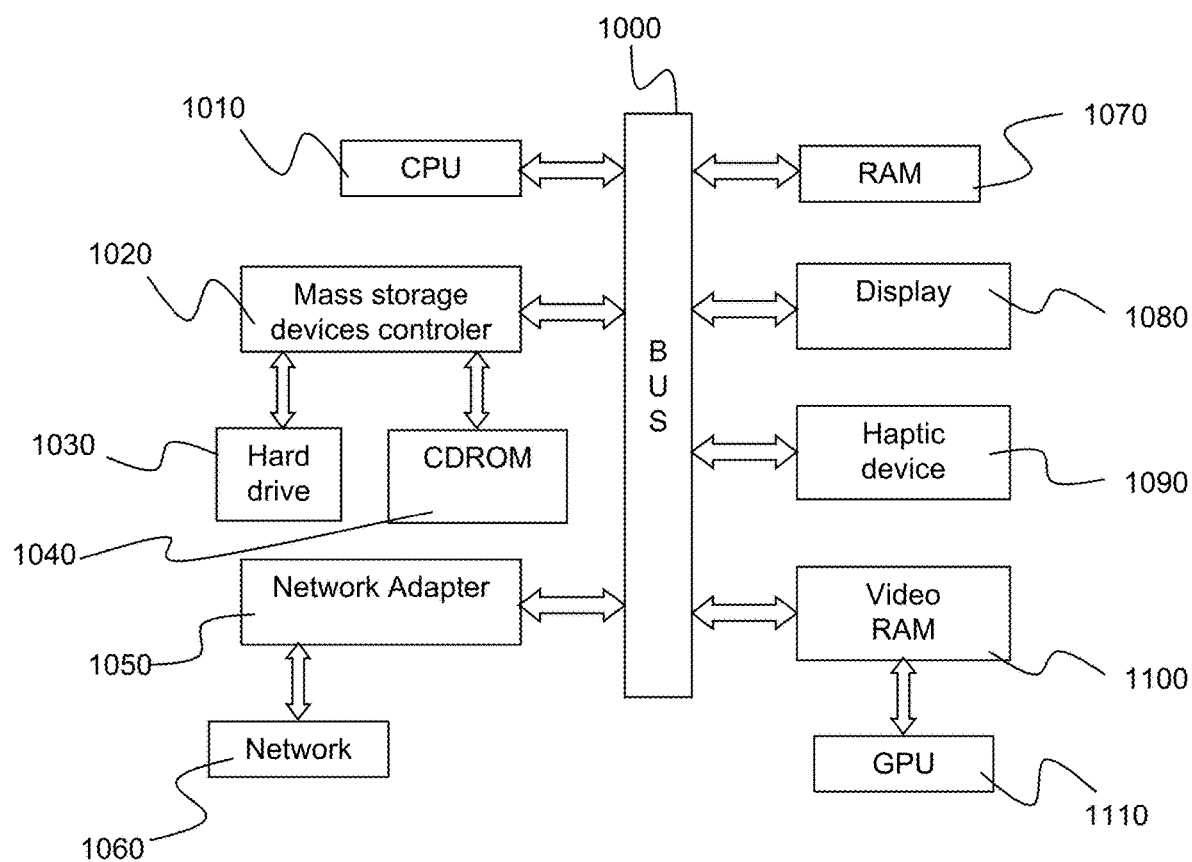
FIG. 2 shows an example of the system.

FIG. 2 shows an example of the system, wherein the system is a client computer system, e.g. a workstation of a user.

The client computer of the example comprises a central processing unit (CPU) 1010 connected to an internal communication BUS 1000, a random-access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively, or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a product, such as a part, or an assembly of parts.

Referring back to FIG. 1, examples of the method are now discussed. A 3D scene is provided (S10). This means that the system can access the data of the 3D scene and perform computations on these data.

The 3D scene is an oriented 3D space (e.g. with a reference frame) so that each object in the 3D scene has a position with respect to the 3D scene. The 3D scene comprises at least one modeled object, typically a 3D modeled object.

A first 3D view of the 3D scene is provided (S10). The first 3D view is displayed from a plane of a locked viewpoint of the 3D scene. This means that the camera from which the viewpoint is obtained is located on a plane. The plane being located in the 3D space, the camera has a position in the 3D scene (also referred to as 3D position), and therefore the locked viewpoint has a 3D position.

The first 3D view of the 3D scene is displayed from a plane of a locked viewpoint of the 3D scene. Such situation may occur if the 3D scene comprises a 2D image (that is, the 3D scene comprises a 2D object), which is a 2D plane in the 3D space: the camera is located in a plane that may be parallel to the 2D plane of the 2D image. This allows for instance that the 3D view of the 2D image is not distorted.

In examples, the first 3D view of the 3D scene is displayed from a plane of a locked viewpoint of the 3D scene and a 3D target position. The 3D target position is the position of the camera on the plane. For instance, in the event the 3D scene comprises a 2D image, the camera may be placed at a specific 3D position (the 3D target position) on the plane that is parallel to the 2D plane of the 2D image. This contributes to limit effects of distortions of the 2D image in the first 3D view.

In examples, the 3D target position may be obtained by selecting, in the 3D scene, a 3D modeled object that will act as target object. Once selected, the camera is positioned on the plane of the locked viewpoint of the 3D scene so that the first 3D view displays the target object in the centre of the 3D scene. The camera is thus orientated toward the target object. It has to be understood that the expression centre of the 3D scene may encompass situations in which the target object is not exactly centered in the first 3D view, but rather sensibly centered. This position of the camera on the plane of the locked viewpoint of the 3D scene is called 3D target position.

The selection of the target object may be performed by the user; the user selects the object by performing a selection operation, e.g. the user clicks on the target object. The selection may be automatically performed by the system. If the 3D scene comprises only one object, the selection is straightforward. If the 3D scene comprises two or more 3D modeled objects, the selection comprises the computation of an average centre of the 3D modeled objects of the 3D scene, and this average centre is used as "virtual target object". The average centre may be obtained by using Euclidian distances between the 3D modeled objects in the 3D scene.

A centre of the target object may be determined for the display of the target object in the centre of the 3D scene; thus, the camera at the 3D target position is oriented toward the centre of the target object. The centre of the target object may be computed by using the bounding box of the target object. The bounding box may be a parallelepiped that completely encloses the target object, as known in the art. More generally, the bounding box may be a bounding volume. If the 3D scene comprises several 3D objects, the bounding boxes of the 3D objects may be used for computing the "virtual target object": centres of the bounding boxes of the 3D objects are used for computing an average centre. Alternatively, and as another example, the set of 3D objects in the 3D scene may be enclosed in a main bounding volume (e.g. a bounding box), the main bounding box providing a center that may be used for determining the display of the target object in the centre of the 3D scene.

Figure 3:
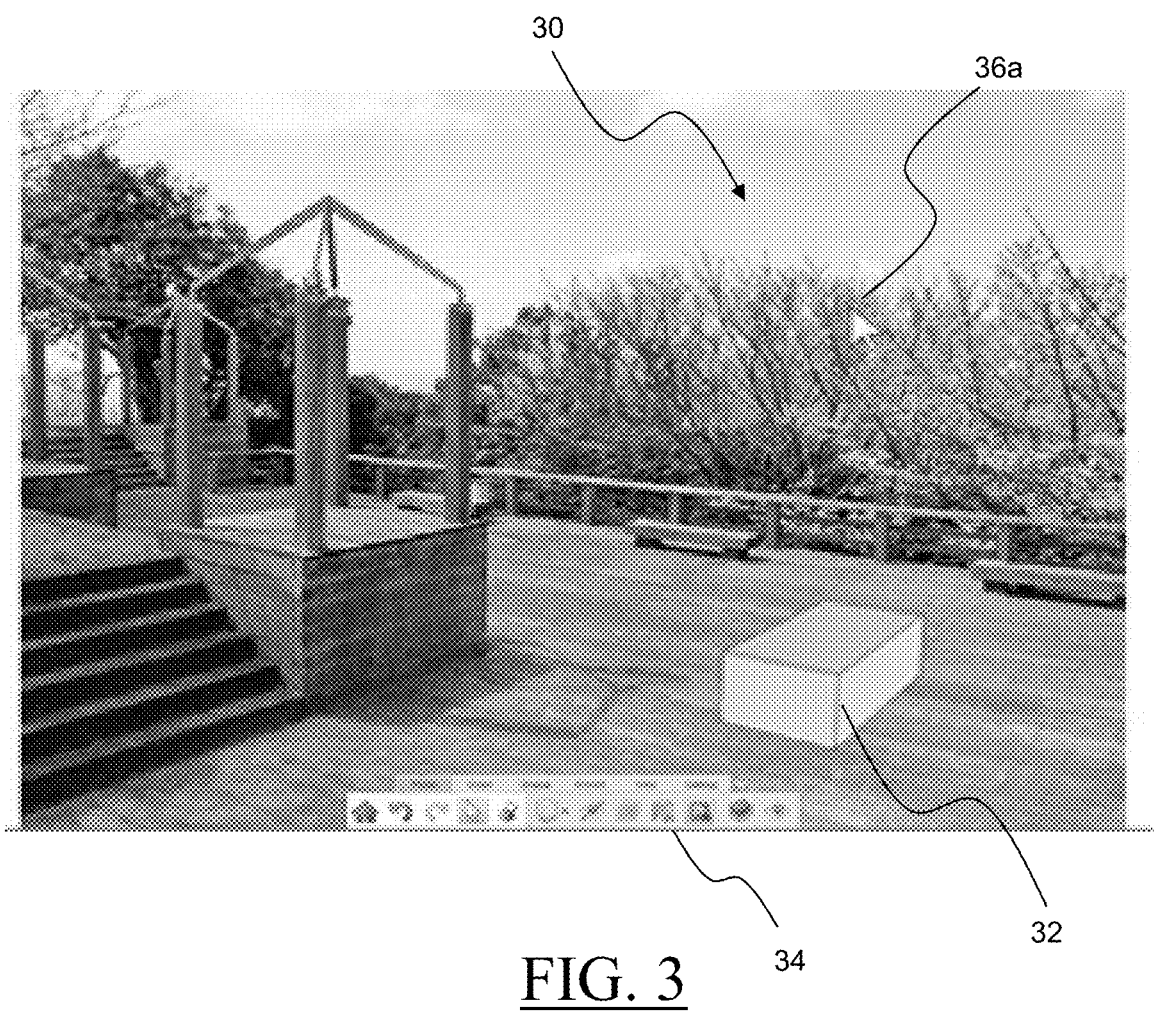
FIGS. 3, 4 and 5 are screenshots of an example of the method.

Referring now to FIG. 3, an example of the providing S10 is now discussed. In this example, the providing comprises displaying the 3D scene, e.g. in a graphical user interface (GUI). The 3D scene 30 comprises two objects. The first object is a 2D image that represents a view on a garden. The second object 32 is a 3D modeled object that is a parallelepiped. The 3D scene is a pseudo-3D scene as it is a mix of 2D (forming here a background) and 3D representations. The view on the 3D scene is called first 3D view. This first 3D view is displayed from a plane of a locked viewpoint of the 3D scene and a 3D target position. The plane is parallel to the background 2D image representing the garden, and the parallelepiped is the target object. The first 3D view, initially centered on the target object, has been moved to the right as a result of a left pan (in the plane) of the camera.

The 3D scene is provided together with a tool bar 34 having standard menu bars, as well as bottom and side toolbars (not represented). Such menu- and toolbars contain a set of user-selectable icons, each icon being associated with one or more operations or functions, as known in the art. Some of these icons are associated with software tools, adapted for editing and/or working on the 3D modeled object 32 displayed in the GUI. The software tools may be grouped into workbenches. Each workbench comprises a subset of software tools. In particular, one of the workbenches is an edition workbench, suitable for editing geometrical features of the modeled product. In operation, a designer may for example pre-select a part of the object and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data related to the displayed product. The GUI may further show various types of graphic tools for example for triggering a simulation of an operation of an edited product or render various attributes of the displayed product. A cursor, at location 36a on the plane of the locked viewpoint, may be controlled by a haptic device to allow the user to interact with the graphic tools. The haptic device may be a mouse, a display if the display is a touch-sensitive display, . . . .

Referring back to FIG. 1, a continuous user interaction is detected S20 by the system. The continuous user interaction comprises a displacement between a first location on the plane and a second location on the plane. The user interaction may be a slide on a touch-sensitive display performed with an appendage such as a finger, a device such as a stylus. During the slide, the appendage is continuously in contact with the touch-sensitive display, e.g. the appendage remains in contact with the touch-sensitive screen from a first to a second position on the touch-sensitive display. The user interaction may be performed with a haptic device that controls the cursor; the user maintains a button of the haptic device down while moving the haptic device. It is to be understood that any other continuous user interaction may be performed.

The first location on the plane is the location on which the continuous user interaction has started. The second location on the plane is the location of the plane the continuous user detection has been detected.

The second location may be the location on the plane at which the user stops performing the continuous user interaction, e.g. the finger is not more in contact with the touch-sensitive display or the user has released the button of the haptic device.

The second location may be the location on the plane at which the user has stopped displacing the user interaction, e.g. the user does not move anymore their finger while keeping the finger in contact with the touch-sensitive display, the user stops acting of the haptic for moving the cursor but still maintains the button down. It is to be understood that if the displacement starts again from the second location and is in the continuity of the former displacement (e.g. the finger was maintained on the display, the button was maintained down), the former and the current displacement are seen by the system as forming one single displacement.

The displacement is performed on the plane of the locked viewpoint of the 3D scene. Said otherwise, it is performed on the same plane the camera is locked in. While the user performs the displacement, a distance between the first and second locations on the plane is computed S30. The distance may be an Euclidian distance on the plane of the locked viewpoint. Thus the distance increases when the second location moves away the first location and decreases if the second location gets close the first location. The computation of the distance is carried out after the user performs the displacement, e.g. for each second location detected by the system when the gesture is performed by the user.

Next, S40, a comparison is performed between the computed distance and a predetermined distance. It is to be understood that values of distances are compared. The comparison is made after each computation of the distance: for each acquired distance between the first and second locations, a comparison is performed.

The comparison is a test that determines whether or not the travel of the continuous user interaction on the plane excesses a threshold called predetermined distance. If the computed distance is not greater than the predetermined distance, nothing happens. If the computed distance is greater than the predetermined distance, then a switch S50 of the first 3D view to a second 3D view of the 3D scene is carried out. The switch triggers a movement of the camera in the 3D scene: the locked viewpoint is unlocked. The comparison improves ergonomics as the switch is triggered only if a minimal distance is traveled by the continuous user interaction: too small or involuntary displacements do not trigger the switch. The expression "greater than" may mean "greater than or equal to" ($\geq$) or "greater than" ($>$).

In examples, switching from the first 3D view to the second 3D view may comprise moving the camera on the plane; the viewpoint of the first 3D view is unlocked, but is kept on the plane.

In examples, the second 3D view of the 3D scene may be a 3D view on 3D objects only. This involves that if the first view on the 3D scene comprises 2D elements, these elements are removed of the 3D scene or displayed as 3D objects (e.g. as a plane in the 3D scene). For instance, an icon (a 2D object) might be represented as a 2D surface in the 3D space.

In examples, a viewpoint of the second 3D view may be computed S42 based on the first and second locations on the plane. This means that the distance between the first and second locations on the plane and/or the relative positions of the second location with respect to the first location are used for determining the second 3D view. The computation S42 may be performed after the comparing S40 and/or after the switching S50. In a first example, the displacement of the position of the camera is proportional to the measured distance. In a second example, the direction of the movement of the camera on the plane is the same as the direction of the displacement between the first and the second location. In a third example, the first and the second examples are combined. In a fourth example, the locked viewpoint (obtained with the locked camera) performs a rotation in the 3D scene. In a fifth example based on the fourth one, the rotation is performed around the target object that defines an axis of rotation. In a sixth example, the first and/or fourth and/or fifth examples are combined.

In examples, a ratio between the computed distance and the predetermined distance is obtained for computing the viewpoint on the second 3D view. The use of a ratio improves ergonomics as less distance needs to be performed by the user interaction for computing the viewpoint of the second 3D view. In these examples, a value of the ratio between the computed distance and the predetermined distance is computed. The value may be computed while the user interaction is performed (e.g. while the second location moves away the first location or gets close the first location), being understood that this computation is carried out after the comparing S40. Then, the locked viewpoint on the first 3D view is unlocked and modified to form the viewpoint of the second 3D view, the modification of the locked viewpoint being based on the computed value of the ratio. The modification of the locked viewpoint may be performed while the user interaction is performed. Alternatively, the modification of the locked viewpoint may be performed after the switch is carried out.

When the locked viewpoint is modified while the user interaction is performed, the first 3D view on the 3D scene may be modified for each detected location of the second location, and each modification for each detected location may be displayed. This provide the user with a real-time graphical feedback of their gesture.

In examples, the values of the ratio may be used for computing a rotation of the locked viewpoint that is performed according to two rotation speeds. In an example, if the computed value of the ratio is comprised between P and Q, with P and Q real numbers and P<Q, a rotation of the locked viewpoint is started with a first rotation speed. The changes of the locked viewpoint are displayed. If the computed value of the ratio is greater than Q, the rotation of the locked viewpoint continues to be displayed, but with a second rotation speed. Hence, the increase of the value of the ratio can control three states: nothing happens while the value is not greater than a first threshold P, the locked viewpoint is unlocked and a rotation starts to be applied with a first rotation speed when the first threshold is reached and while a second threshold Q is not reached, the rotation speed is changed with a second rotation speed when the second Q is exceeded. The user thus receives a visual feedback of the state of the gesture as perceived by the system. This improves interactions with the system as the user can comprehend when the system is ready to switch from the first to the second view.

In an example, the values of the ratio are P=1 and Q=2 and the second rotation speed is 10 times larger than the first rotation speed. This improves the interactions of the user with the system. When the value of the ratio is comprised between 1 and 2, the unlocked view point of the first 3D view slowly rotates, indicating that the system is a state ready to perform the switch if the distance between the first and second locations is continuing to increase. Once the value Q=2 is reached, the second view is displayed to the user and the rotation of the unlocked view point of the second view can continue with the second rotation speed.

In examples, the rotation that is applied with the first or second rotation speed is proportional to the distance between the first and second locations. This means that the angle of rotation progressively increases with the increase of the distance (S30).

In examples, the proportionality between the angle of rotation and the computed distance (S30) allows applying an inverse rotation angle in the event the distance between the first and the second decreases. For instance, after the switch, the user can freely rotate the viewpoint of the second 3D view for configuring the desired unlocked viewpoint point of the second 3D view.

As already discussed, the user interaction is continuous; the system continuously detects the interaction. In example, the system may detect that the user has stopped the interaction. Said otherwise the continuous user interaction is released. In this situation, if the switch (S50) has not been carried out, the locked 3D view is still displayed to the user, or if the viewpoint has temporarily been unlocked, the viewpoint of the first 3D scene is locked again after having get back its initial position (the viewpoint of the first 3D view).

In an example, if the continuous user interaction is released while the computed value of the ratio is comprised between P and Q, the rotation of the unlocked viewpoint may be stopped (that is, no more controlled upon user action) and the unlocked view point may get back its initial position as locked viewpoint of the first 3D view of the 3D scene. The return to the initial unlocked position may be displayed, e.g. it may be performed with the first rotation speed and by applying the inverse angle of rotation: the returning to the initial locked viewpoint is less abrupt for the user, thus improving ergonomics for the user.

In an example, if the continuous user interaction is released for the value of the ration that is larger than Q, the rotation of the current viewpoint may be stopped. However, the switch S50 having been performed, the rotated unlocked viewpoint is set as the viewpoint of the second 3D view.

Examples of the method with a rotation of the unlock viewpoint of the first 3D view have been discussed. The rotation is performed about a rotation axis that is located in the 3D scene. The computations for performing the rotation may done as known in the art. The computation of the axis is now discussed. In a former example, namely the fifth example hereinabove, the rotations is performed about a target object that defines an axis of rotation. The selection of the target object may be performed as previously discussed. One understands that a "virtual target object" may be used in the event the 3D scene comprises two of more virtual objects. The axis of rotation may be defined centered on the at least one target object. This means that the rotation axis comprises the center of the target object (or the center of the "virtual target object"). In an example, the centre of the target object may be computed by using the bounding box of the target object. At least three axis may be defined on a bounding box, each one passing through the centre of the bounding box and the middle of two opposite faces. A default axis may be selected by the system, for instance the axis with a direction that is the closest to a main oriented of the oriented 3D space. If the 3D scene is oriented with a reference frame, the rotation axis selected by the system may be the one with the closest direction with respect to a main direction of the 3D scene, or the one with the closest direction with respect to one of the three main directions provided by the reference frame. It is to be understood that the automatic selection of the rotation axis may be carried out using further criteria.

In examples, the predetermined distance may be selected upon user action, e.g. before the detecting S20.

In examples, the predetermined distance may be computed from characteristic of the display of the system that executes the method. For instance, the predetermined distance is comprised between 15% and 30% of the Euclidian distance of a width of the display. In an example, the predetermined distance represents about 20% of the width of the display. It is to be understood that the length might be used, the diagonal as well, e.g. the predetermined distance is comprised between 15 and 30% of the Euclidian distance of a length of the display. Computing the predetermined distance from characteristic of the display ensures that the unlock distance is always available, regardless of the orientation of the device, e.g. a smartphone or a tablet may be horizontally or vertically handled.

The user interaction being continuous, the first location is unchanged. Only the second location can change, depending on the user action. The system knows at any time where is located the second user interaction. The system regularly checks the location of the second location. Depending on the system, the frequency check may vary. In an example, if the second location is unchanged between two checks, the subsequent steps of the method is not performed. In examples, if the second location has changed between two checks, the subsequent steps is performed.

Figure 4:
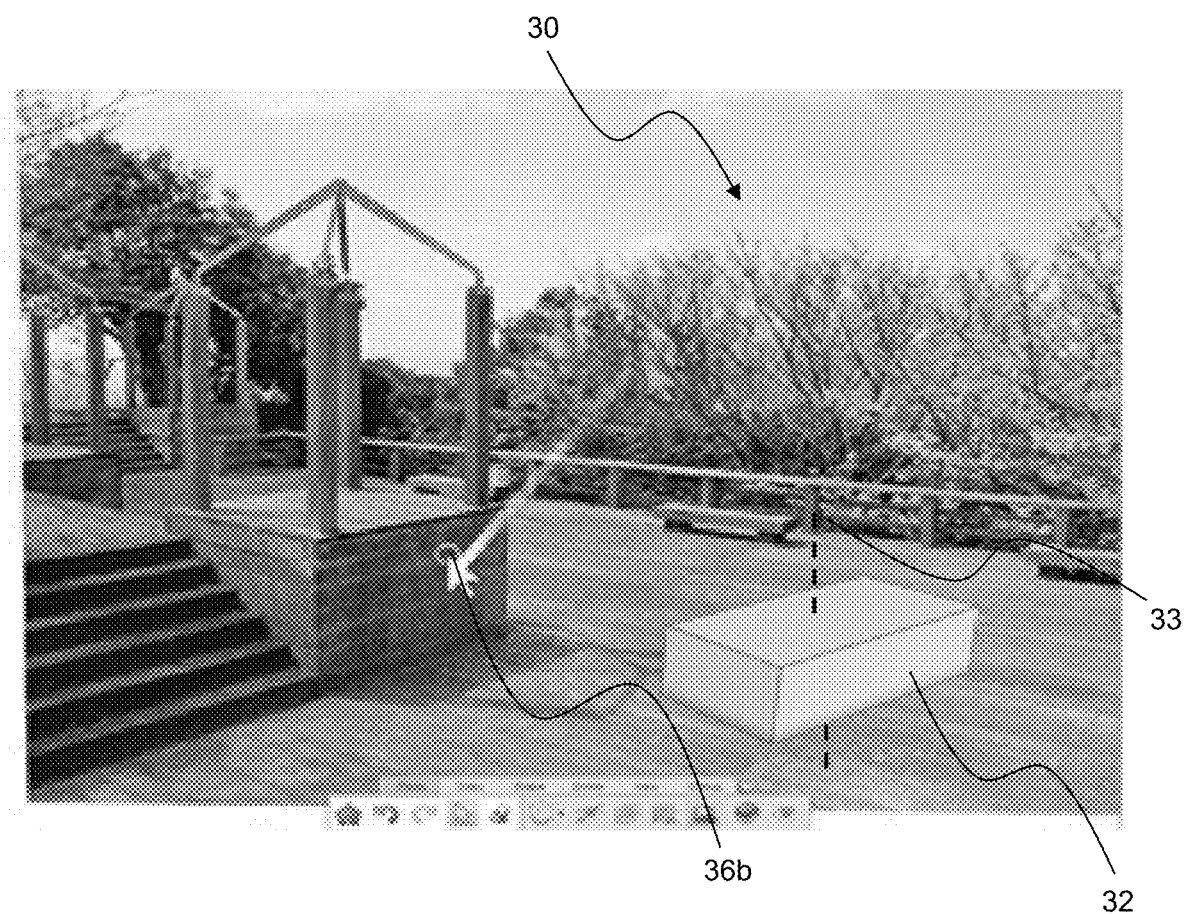

An example of the method is now illustrated with reference to FIGS. 3 to 5. FIG. 3 has been discussed and illustrates an example of the providing S10. The display of the first view of the 3D scene being done, the user starts user interacting for triggering the switch from the first view to the second view on the 3D scene. The first location is the location 36a of the cursor on the plane of the locked viewpoint of the 3D scene. The plane of the locked view is parallel to the background image representing the garden. Referring now to FIG. 4, the user has displaced the cursor from the first location 36a to a second location 36b in the 2,5D scene. The first location may contribute to define the final orientation. Indeed, the first location 36a is on the top right corner so that the most space available for the movement is in the direction of the left of the figure. During the displacement of the cursor from the first location 36a to the second location 36b, values of the ratio between the computed distance and the predetermined distance are computed. When a value of ratio exceeds or is equal to 1, the first view on the 3D scene is unlocked. While the values of the ratio are comprises comprised between 1 and 2, the camera of the unlocked 3D view rotates about an axis defined from a bounding box of the target object 32. The rotation is proportional to the distance between the first and second locations, and therefore proportional to the ratio. For the sake of explanation only, the axis 33 is represented on FIG. 4 with a line. It is to be understood that the axis may be materialized in the 3D scene by a point (with 3D coordinates in the 3D scene) serving a rotation axis. The user can displace the cursor back and forth. Hence, while the ratio is comprised between 0 and 2, the unlocked viewpoint of the first 3D view rotates in accordance with the continuous user interaction, and if the user releases the continuous user interaction, the locked 3D view is displayed again, as shown on FIG. 3. Therefore, once the ratio has reached a ratio of value equal to 1, the user can cancel the gesture by releasing the user interaction. The first rotation speed used during this part de gesture provides the user with an effect of resistance of the gesture, thus informing the user that the system is ready for triggering the switch if the distance between the first and second location is increased. The part of the gesture for the ratio comprised between P and Q allows the user to prepare the viewpoint in the second 3D view, thus allowing the user to prepare the acquisition of the desired viewpoint of the second 3D view.

Figure 5:
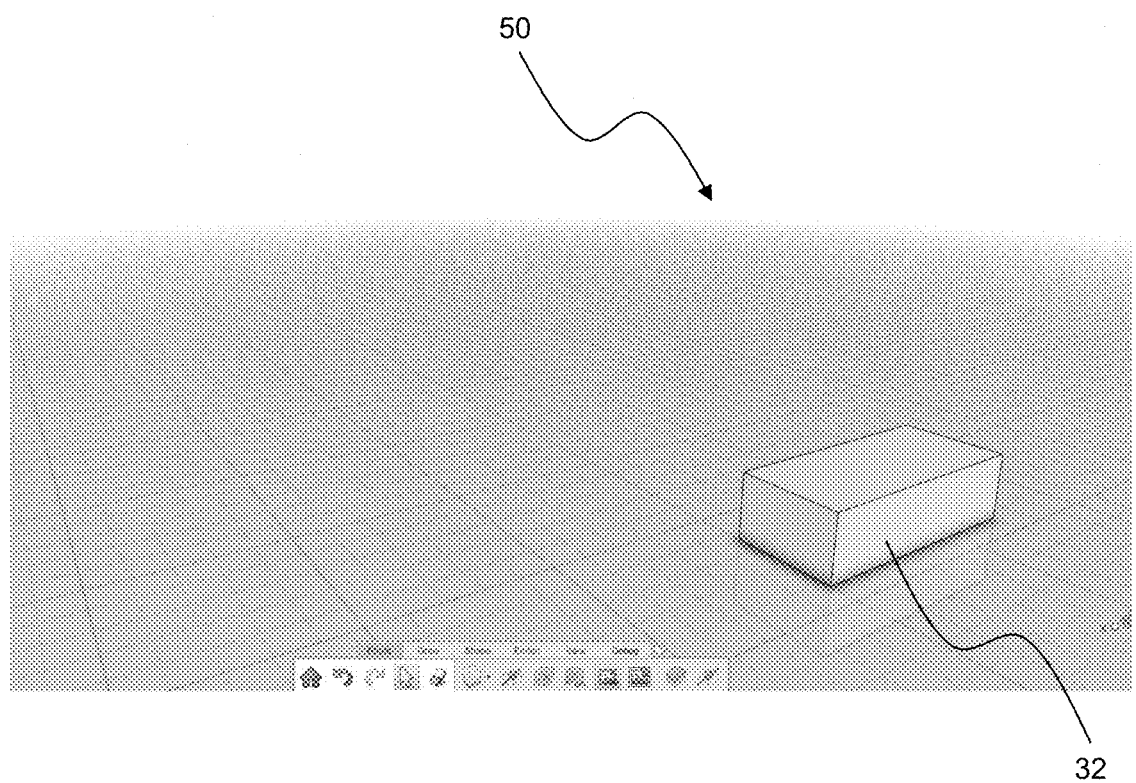

FIG. 5 is a representation of the displayed second 3D view of the 3D scene, that has been obtained after the switch S50. The second 3D view is free of the 2D constraint of FIGS. 3 and 4. Indeed, the 2D background image (the garden) has been removed from the 3D scene so that the 3D scene comprises only 3D objects—the parallelepiped 32. Interestingly, if user interaction is maintained after the switch, the unlock viewpoint on the 3D view can still be configured until the user stops user interacting, e.g. the user is satisfied by the unlocked viewpoint of the second 3D view. As the rotation speed is higher after the switch, the user can more quickly select the desired viewpoint, thus increasing ergonomics. Once the user interaction is stopped, the viewpoint is maintained with its last position, as represented on FIG. 5.

The invention claimed is:

1. A computer-implemented method for switching from a first 3D view of a 3D scene to a second 3D view of the 3D scene, the method comprising:
   obtaining the first 3D view displayed from a plane of a locked viewpoint of the 3D scene, the 3D scene comprising a 2D background image and at least one 3D object, the plane of the locked viewpoint being parallel to the 2D background image, and the at least one 3D object hiding at least part of the 2D background image in the first 3D view, the 2D background image being not selectable;
   detecting a continuous user interaction including a displacement between a first location on the plane and a second location on the plane;
   computing a distance between the first and second locations on the plane for each modification of the second location;
   comparing the computed distance with a predetermined distance; and
   responsive to the determination that the computed distance is greater than the predetermined distance, switching from the first 3D view to the second 3D view, the 2D background image having been removed from the 3D scene in the second 3D view,
   where in the method further comprises, after the comparing:
   computing a viewpoint of the second 3D vie w based on the first and second locations on the plane, and
   where in the computing the viewpoint of the second 3D view further comprises:
      computing a value of a ratio between the computed distance and the pre determined distance;
      unlocking the locked viewpoint; and
         modifying the unlocked viewpoint to form the viewpoint of the second 3D view, the modification of the unlocked viewpoint being based on the computed value of the ratio.

2. The computer-implemented method of claim 1, wherein:
   if the computed value of the ratio is comprised between P and Q, with P and Q real numbers and P<Q, starting displaying a rotation of the unlocked viewpoint with a first rotation speed, and
   if the computed value of the ratio is larger than Q, continuing displaying the rotation of the unlocked viewpoint with a second rotation speed.

3. The computer-implemented method of claim 2, wherein the starting of displaying a rotation of the unlocked viewpoint is performed on the first 3D view of the 3D scene and the continuing of displaying the rotation of the unlocked viewpoint is performed on the second 3D view of the 3D scene.

4. The computer-implemented method of claim 2, wherein P=1, Q=2, and the second rotation speed is 10 times larger than the first rotation speed.

5. The computer-implemented method of claim 2, wherein if the continuous user interaction is released while the computed value of the ratio is comprised between P and Q:
   stopping the rotation of the unlocked viewpoint; and
   returning to the locked viewpoint with the first rotation speed.

6. The computer-implemented method of claim 2, wherein if the continuous user interaction is released for the value of the ratio that is larger than Q:
   stopping the rotation of a current viewpoint; and
   setting the rotated locked viewpoint as the viewpoint of the second 3D view.

7. The computer-implemented method of claim 2, and wherein the rotation of the unlocked viewpoint is performed about an axis of rotation centered on at least one target object.

8. The computer-implemented method of claim 1, wherein the predetermined distance is comprised between 15 and 30% of a Euclidian distance of a width of a display displaying the obtaining.

9. A non-transitory computer-readable storage medium having recorded thereon a computer program including instructions for performing a method for switching from a first 3D view of a 3D scene to a second 3D view of the 3D scene, the method comprising:
   obtaining the first 3D view displayed from a plane of a locked viewpoint of the 3D scene, the 3D scene comprising a 2D background image and at least one 3D object, the plane of the locked viewpoint being parallel to the 2D background image, and the at least one 3D object hiding at least part of the 2D background image in the first 3D view, the 2D background image being not selectable;
   detecting a continuous user interaction including a displacement between a first location on the plane and a second location on the plane;
   computing a distance between the first and second locations on the plane for each modification of the second location;
   comparing the computed distance with a predetermined distance; and
   if the computed distance is greater than the predetermined distance, switching from the first 3D view to the second 3D view, the 2D background image having been removed from the 3D scene in the second 3D view,
   where in the method further comprises, after the comparing:
   computing a viewpoint of the second 3D view based on the first and second locations on the plane, and
   where in the computing the viewpoint of the second 3D view further comprises:
      computing a value of a ratio between the computed distance and the pre determined distance;
      unlocking the locked viewpoint; and
      modifying the unlocked viewpoint to form the viewpoint of the second 3D view, the modification of the unlocked viewpoint being based on the computed value of the ratio.

10. The non-transitory computer-readable storage medium of claim 9, wherein:
   if the computed value of the ratio is comprised between P and Q, with P and Q real numbers and P<Q, starting displaying a rotation of the unlocked viewpoint with a first rotation speed, and
   if the computed value of the ratio is larger than Q, continuing displaying the rotation of the unlocked viewpoint with a second rotation speed.

11. The non-transitory computer-readable storage medium of claim 10, wherein the starting of displaying a rotation of the unlocked viewpoint is performed on the first 3D view of the 3D scene and the continuing of displaying the rotation of the unlocked viewpoint is performed on the second 3D view of the 3D scene.

12. The non-transitory computer-readable storage medium of claim 10, wherein if the continuous user interaction is released while the computed value of the ratio is comprised between P and Q:
  stopping the rotation of the locked viewpoint, and
  returning to the unlocked viewpoint with the first rotation speed.

13. The non-transitory computer-readable storage medium of claim 10, wherein if the continuous user interaction is released for the value of the ratio that is larger than Q:
  stopping the rotation of a current viewpoint, and
  setting the rotated locked viewpoint as the viewpoint of the second 3D view.

14. A system comprising:
  a processor coupled to a memory and a display, the memory having recorded thereon a computer program including instructions for switching from a first 3D view of a 3D scene to a second 3D view of the 3D scene that when executed by the processor causes the processor to be configured to:
  display on the display the first 3D view displayed from a plane of a locked viewpoint of the 3D scene, the 3D scene comprising a 2D background image at least one 3D object, and the plane of the locked viewpoint being parallel to the 2D background image, and the at least one 3D object hiding at least part of the 2D background image in the first 3D view, the 2D background image being not selectable,
  detect a continuous user interaction including a displacement between a first location on the plane and a second location on the plane,
  compute a distance between the first and second locations on the plane for each modification of the second location,
  compare the computed distance with a predetermined distance, and
  if the computed distance is greater than the predetermined distance, switch from the first 3D view to the second 3D view, the 2D background image having been removed from the 3D scene in the second 3D view,
  where in the processor is further configured to, after being configured to compare:
  compute a viewpoint of the second 3D vie w based on the first and second locations on the plane, and
  where in the processor is further configured to compute the viewpoint of the second 3D view by being further configured to:
    compute a value of a ratio between the computed distance and the predetermined distance,
    unlock the locked viewpoint, and
    modify the unlocked viewpoint to form the viewpoint of the second 3D view, the modification of the unlocked viewpoint being based on the computed value of the ratio.

15. The system of claim 14, wherein the display is a touch-sensitive display for receiving and detecting user interactions.

* * * * *